March 4, 1941.  E. J. BLOOM  2,233,397

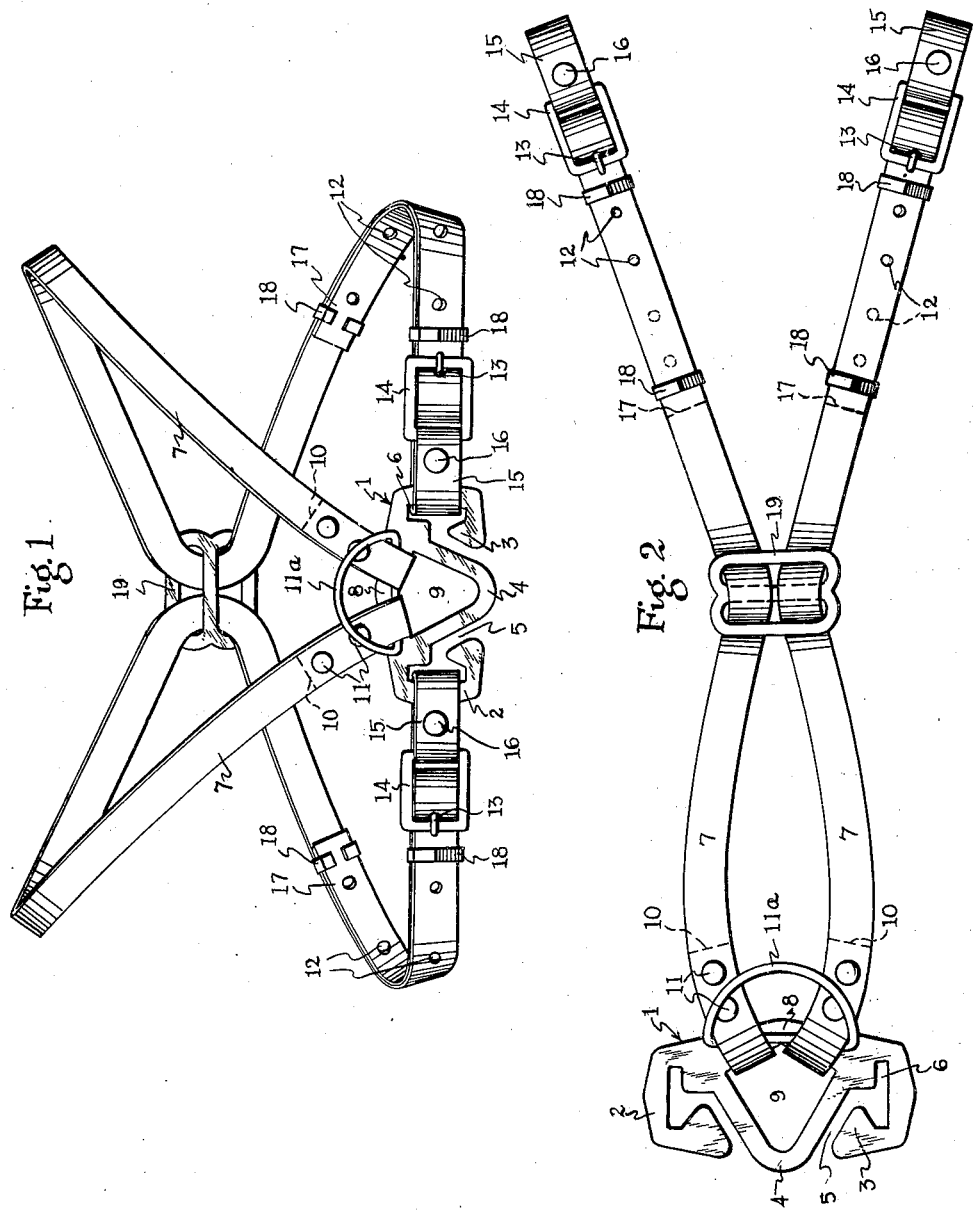

HARNESS FOR DOGS AND CHILDREN

Filed Feb. 20, 1939  2 Sheets-Sheet 2

INVENTOR.
Edgar J. Bloom
BY
J. S. Murray
ATTORNEY.

Patented Mar. 4, 1941

2,233,397

UNITED STATES PATENT OFFICE 2,233,397

HARNESS FOR DOGS AND CHILDREN

Edgar J. Bloom, Tiffin, Ohio

Application February 20, 1939, Serial No. 257,446

13 Claims. (Cl. 227—49)

This invention relates to harnesses and particularly harnesses for dogs and small children.

An object of the invention is to provide a dog harness definitely avoiding a choking effect on throat, undue pressure on throat muscles, cords, and nerves effecting the lungs and heart, particularly when a dog strains against a leash attached to the harness.

Another object is to adapt a harness suitable for dogs or small children to be quickly, easily and accurately adjusted for variation of its size, and to provide for a much greater range of such adjustment than has heretofore been afforded.

A further object is to provide a harness of the aforementioned character with a fastening means disposed for maximum accessibility and permitting attachment and detachment of the harness more quickly and easily than prior harnesses and without disturbance of the adjustment for size.

Other objects are to render a dog harness more free fitting than heretofore without sacrifice of security and to eliminate chafing.

These and various other objects are attained by the construction hereinafter described and illustrated in the accompanying drawings, wherein:

Fig. 1 is top view of the harness with its straps fastened, as when in use.

Fig. 2 is a top view of the harness with its straps free and extended.

Figure 3:
Fig. 3 is a side view of an end portion of one of the harness straps, particularly disclosing its adjustability in length.
Figure 5:
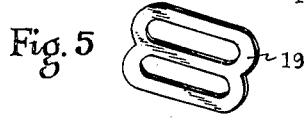
Fig. 5 is a perspective view of a slide buckle serving both to adjust the harness and to form its collar and girth band portions.
Figure 4:
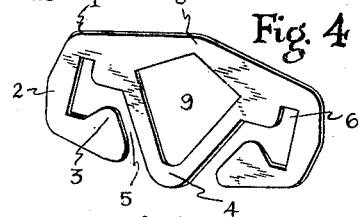
Fig. 4 is a perspective view of the main buckle.

In these views, the reference character 1 designates a buckle-forming plate, preferably oblong and stamped from sheet metal, the ends of such plate forming hooks 2 having enlarged end portions 3 projecting toward each other, and the mid portion of the plate forming a substantially V-shaped tongue 4, projecting between the hooks and spaced from the latter to form a pair of restricted passages 5 divergently leading from a longer edge of the plate to substantially parallel keeper slots 6 which define the shanks of the hooks. The enlargements 3 cause the passages 5 to open into the slots 6 approximately midway between the ends of such slots, so that strap members (presently to be described) engaging in the slots must be turned through a considerable angle to register their edges with the passages 5.

A pair of straps 7, formed preferably of leather, are looped at corresponding ends to engage an angular bar 8 formed at the base of the tongue 4 by an opening 9 in the tongue. The loops 10 thus engaging the buckle occupy an approximately side-by-side relation and are permanently closed as by rivets 11. Preferably the loops 10 also jointly serve for attaching a leash ring 11a to the harness. The other end portions of the straps 7 are each formed with a series of eyelets 12, for selective engagement by the prong 13 of a buckle 14, and to each of the latter is pivoted a short looped keeper strap 15, held to its loop form by a rivet 16. Each strap 15 forms opposite return bends, adapting one end portion of the strap to overlap the other, the rivet 16 securing the end portions in their lapped relation and clamping them to the mid portion of the strap, as best appears in Fig. 3. The portions 17 of the straps 7 projecting beyond the buckles are doubled back along the straps and held against the latter by one or more metal retainers 18.

The mid portions of the two straps are interconnected by a slide piece 19 of well-known form, forming three spaced bars, the straps passing under the outer bars and over the central one. In engaging such slide piece, the straps occupy an approximately edge-to-edge relation.

Figure 6:
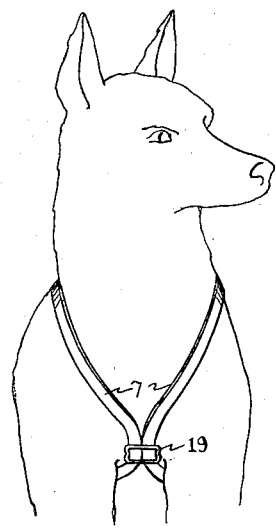
Fig. 6 is a front view of a dog showing the harness and its slide buckle in place.

In applying the described harness to a dog, the portions of the straps permanently extending from slide piece to buckle plate form a collar which is slipped over the dog's head and drawn back against his shoulders. The slide piece assumes a position approximately between the animal's forelegs. (See Fig. 6.) The remaining portions of the straps from a girth band, said portions being brought up rearwardly of the forelegs and at opposite sides of the body and the keeper straps 15 being engaged with the hooks 2. When thus applied, the harness will engage the animal securely but not tightly, if proper adjustments have been made. These adjustments consist in giving the two straps a correct and equal length by selecting the proper eyelets 12 to receive the buckle prongs 13; and in shifting the slide-piece to properly proportion the shoulder collar to the girth band. Ordinarily said collar and band will be of substantially equal size, but the construction permits any desired differentiation between the collar and band.

It is a feature of this slide piece, as applied to the described harness, that it offers little resistance to sliding adjustment on the straps 7, when the latter are parallel or substantially so, as when the harness is not in use. When, however, the harness is fitted upon a dog or other animal, the straps form fairly sharp bends and twists at front and rear of the slide piece in conforming to body curvature, and this has the effect of locking the slide piece securely in its adjusted position, so that proper relative proportioning of the collar and girth band will not be disturbed.

Figure 7:
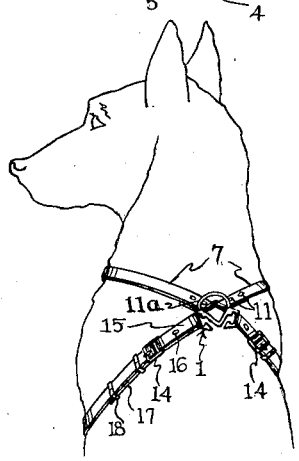
Fig. 7 is a corresponding rear view showing the harness and its main buckle on the dog's back.
Figure 8:
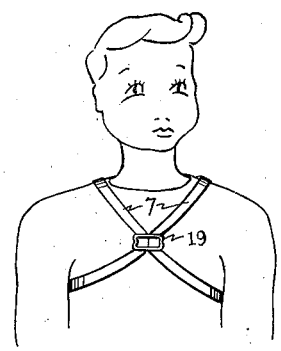
Fig. 8 is a front view of a child showing the harness and its slide buckle in place.
Figure 9:
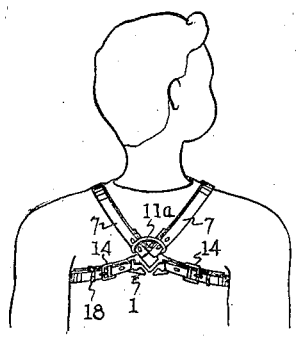
Fig. 9 is a corresponding rear view showing the harness and its main buckle on the child's back.

It will be noted (Fig. 7) that the buckle plate occupies a position above the foreport of the body, where it is readily accessible in applying or removing the harness. Also the adjustment buckles 14 are readily accessible, since they are only slightly distant from the buckle plate. The latter lies flat, in use, and can exercise no chafing effect, being spaced slightly above the dog's back by the strap loops 10 and keeper straps 15.

Stresses reacting from a leash attached to the ring 11a are applied through the harness to the shoulders of the animal, and the shoulder muscles readily withstand such stresses without injury or material discomfort. Such stresses do not restrict breathing or apply undue pressure to any vital organs.

Because of the wide range of adjustability, it is unnecessary to manufacture the described harness in more than a few sizes, and a considerable economy in production results.

The unique design of the buckle plate is such as to permit the keeper straps 15 to be readily hooked to or unhooked from said plate, but precludes an accidental unfastening due to rolling or other activity of the dog. Among the advantages of this buckle plate are that gloves need not be removed in applying or removing the harness, and such operations may be easily performed in the dark, if necessary.

A further important advantage of the described harness lies in the fact that its application or removal in no way disturbs the adjustment for size.

It is to be noted that the provision made at the buckles 13 for regulating the length of both straps 7 greatly increases the range of variation in size as compared to such harnesses as have only a single adjustment provision. A wide adjustment range is particularly advantageous in permitting the harness to be initially fitted to a dog as a puppy and to be kept properly fitted throughout growth of the dog.

An important factor in preventing unfastening of the harness due to rolling or other activity of a dog is an accurate relative proportioning of the hooks 2 and the loops formed by the keeper straps 15. The openings of the loops are sufficiently restricted in length as to create an appreciable frictional resistance to insertion of the enlarged ends of the hooks through such openings. That is to say, the clearance between the hook-engaging return-bent ends of the loops and the opposed clamped end of the loop-forming strap (see Fig. 3) is such that appreciable pressure must be applied to force the loops over the enlargements 3 of the hooks. It is practically impossible for a dog, through any activity, to apply the described pressure to either loop.

In applying the harness to a child the collar portion is slipped over the child's head and brought to rest on the shoulders and the buckle plate is located against the back, the girth portions of the straps being extended under the arms. Thus applied, the child can have no access to the buckle plate.

The parts primarily receiving wear are the short keeper straps 15 and these may be inexpensively replaced when necessary. Use of these straps is further desirable since their pivotal connection to the main straps considerably facilitates engagement with the hooks of the buckle plate.

The invention is presented as including all such modifications and changes as come within the scope of the following claims.

What I claim is:

1. A harness comprising a buckle, a pair of elongated flexible members, means permanently securing corresponding ends of said members to the buckle, a slide piece interconnecting the mid portions of said members and dividing them into a shoulder-engaging collar and a girth band, each jointly formed by said members, said members forming reverse return-bends in engaging the slide piece, and means for detachably connecting the other ends of said members to the buckle.

2. A harness as set forth in claim 1, said permanently secured ends engaging the mid portion of the buckle, and the buckle having a provision at opposite ends thereof for engagement by the other ends of the flexible members.

3. A harness comprising a buckle, a pair of elongated flexible members secured at corresponding ends to the buckle in an approximately side-by-side relation, means for detachably connecting the other ends of the paired members to the buckle, and a slide piece interconnecting the mid portions of said members and dividing them into a shoulder-engaging collar and a girth band, each jointly formed by the paired members, such members occupying an approximate edge-to-edge relation in engaging the slide piece.

4. A harness as set forth in claim 1, the ends of the buckle forming hooks and the detachable ends of the flexible members carrying loops engageable with such hooks.

5. A harness as set forth in claim 1, the flexible members having a provision adjacent to their detachable ends for varying their lengths.

6. A harness comprising a buckle, a pair of elongated flexible members having loops at corresponding ends thereof, attaching such ends to the buckle, a leash ring retained in such loops, means for detachably connecting the other ends of the paired members to the buckle, and a slide piece interconnecting the mid portions of the paired members and dividing them into a shoulder-engaging collar and a girth band, each jointly formed by the paired members.

7. A harness comprising a buckle having hooked ends, a pair of elongated flexible members secured at corresponding extremities to the buckle between its hooked ends, a slide piece connecting the mid portions of said members and dividing them into a shoulder-engaging collar and a girth band, each jointly formed by said members, and a pair of strap loops for detachably engaging the hooked ends of the buckle, and means pivotally mounting said strap loops on the other extremities of the flexible members.

8. In a harness, the combination with a strap forming a loop, of a buckle having an elongated keeper slot for said strap and a passage opening into the slot substantially transversely of the slot length, for admitting the loop to such slot, the slot and passage defining opposite edges of a hook for insertion in said loop, and the hook having a terminal enlargement to resist escape of the loop, the loop and hook being relatively proportioned to set up a frictional resistance to the passage of said enlargement through the loop.

9. In a harness, the combination with a strap return-bent to form a loop, of means for permanently closing the loop, an end of the strap being clamped by said means in an opposed spaced relation to the return-bend, and a buckle having a keeper slot for said loop and a passage for admitting the loop to such slot, the slot and passage defining a hook for insertion in the loop, the hook having a terminal enlargement to resist escape of the loop, and the return-bend and said clamped end of the strap coacting to frictionally oppose passage of said enlargement through the loop.

10. A harness comprising two separately formed elongated flexible members having portions jointly forming a permanently closed collar and having other portions jointly forming a girth band, and means associated with each of such members for regulating its length, such means taking effect intermediately of the ends of the members, whereby regulation is not disturbed by removal of the harness from its wearer.

11. A harness comprising a buckle, a pair of elongated separately formed flexible members secured at corresponding ends to the buckle, a slide piece interconnecting said members and dividing them into a shoulder-engaging collar and a girth band, each jointly formed by such members, and means associated with said members between the slide piece and buckle for regulating the length of both members.

12. A harness comprising a girth band, a collar, and a buckle, the buckle having opposite ends similarly formed with hooks and the girth band having extremities detachably engageable with said hooks, and the buckle being formed with a rearwardly projecting tongue between said hooks resisting accidental disengagement of the girth band from the hooks, and the collar having end portions adjacently attached to and forwardly projecting from the buckle.

13. A harness as set forth in claim 12, said tongue having an aperture wherein said ends of the collar are secured.

EDGAR J. BLOOM.